United States Patent
Wu

(10) Patent No.: US 6,260,277 B1
(45) Date of Patent: Jul. 17, 2001

(54) HANDLES OF GARDENING SHEARS

(76) Inventor: Chin-Sung Wu, P.O. Box 453, Taichung (TW)

( * ) Notice: Subject to any disclaimer, the term of this patent is extended or adjusted under 35 U.S.C. 154(b) by 0 days.

(21) Appl. No.: 09/519,372

(22) Filed: Mar. 6, 2000

(51) Int. Cl.[7] .................................................. B26B 13/12
(52) U.S. Cl. ............................................. 30/232; 30/233
(58) Field of Search ........................... 30/232, 341, 233; 81/427.5; 76/106, 106.5

(56) References Cited

U.S. PATENT DOCUMENTS

| | | | |
|---|---|---|---|
| 5,121,624 | * | 6/1992 | Haughian ........................ 81/427.5 X |
| 5,279,034 | * | 1/1994 | Smith et al. ............................ 30/232 |
| 5,469,624 | * | 11/1995 | Brenton et al. ........................ 30/232 |
| 5,659,959 | * | 8/1997 | Parlowski ............................... 30/232 |
| 5,781,999 | * | 7/1998 | Chang ................................ 30/232 X |

\* cited by examiner

*Primary Examiner*—Douglas D. Watts
(74) *Attorney, Agent, or Firm*—Harrison & Egbert

(57) ABSTRACT

One of two handles of a gardening shears is fastened pivotally at one end thereof with a shaft rod in conjunction with a confining bolt. The shaft rod is provided with a retaining groove in which one end of the confining bolt is retained. The handle is provided in a fastening end thereof with a receiving cell and a rotary spring disposed in the receiving cell to enable the handle to swivel automatically. The handle is provided with an arcuate portion which is separated from the handle by a space dimensioned to accommodate fingers of a user of the gardening shears. The arcuate portion serves as a shield to provided the fingers with a protection against the injury of the fingers by a twig being pruned.

5 Claims, 16 Drawing Sheets

HANDLES OF GARDENING SHEARS

FIELD OF THE INVENTION

The present invention relates generally to a gardening shears, and more particularly to handles of the gardening shears.

BACKGROUND OF THE INVENTION

As shown in FIGS. 1 and 2, a gardening shears 10 of the prior art comprises a fastening rod 11 for fastening pivotally a handle 12 in conjunction with a position confining bolt 13 which is retained at one end thereof in a retaining groove 14 of the free end of the fastening rod 11, as shown in FIG. 4. The handle 12 is provided at one end thereof with a protruded block 16, whereas the fastening rod 11 is provided with a stop edge 15 opposite to the protruded block 16 of the handle 12 for enabling the handle 12 to be swiveled at an angle. The handle 12 is so designed as to facilitate the holding of the handle 12 by hand for a prolonged period of time without the muscle pain or discomfort of the hand.

Such a prior art gardening shears 10 as described above is defective in design in that the handle 12 must be constantly readjusted in its position while the gardening shears 10 is in use, and that the user of the gardening shears 10 is conceivably annoyed at such an inconvenience, and further that the hand 2 holding the handle 12 is susceptible to bruise by a twig 1, as illustrated in FIG. 6, and still further that the gardening shears 10 can not be securely held in the hand 2 in light of the way by which the handle 12 is designed to be held by the hand 2, as illustrated in FIG. 7.

SUMMARY OF THE INVENTION

The primary objective of the present invention is to provide a gardening shears with handles which are free from the deficiencies of the prior art gardening shears described above.

The features, functions and advantages of the present invention will be readily understood upon a thoughtful deliberation of the following detailed description of the preferred embodiments of the present invention with reference to the accompanying drawings.

BRIEF DESCRIPTION OF THE DRAWINGS

FIG. 8 shows an exploded view of a first preferred embodiment of the present invention.

DETAILED DESCRIPTION OF THE PREFERRED EMBODIMENTS

Figure 1:
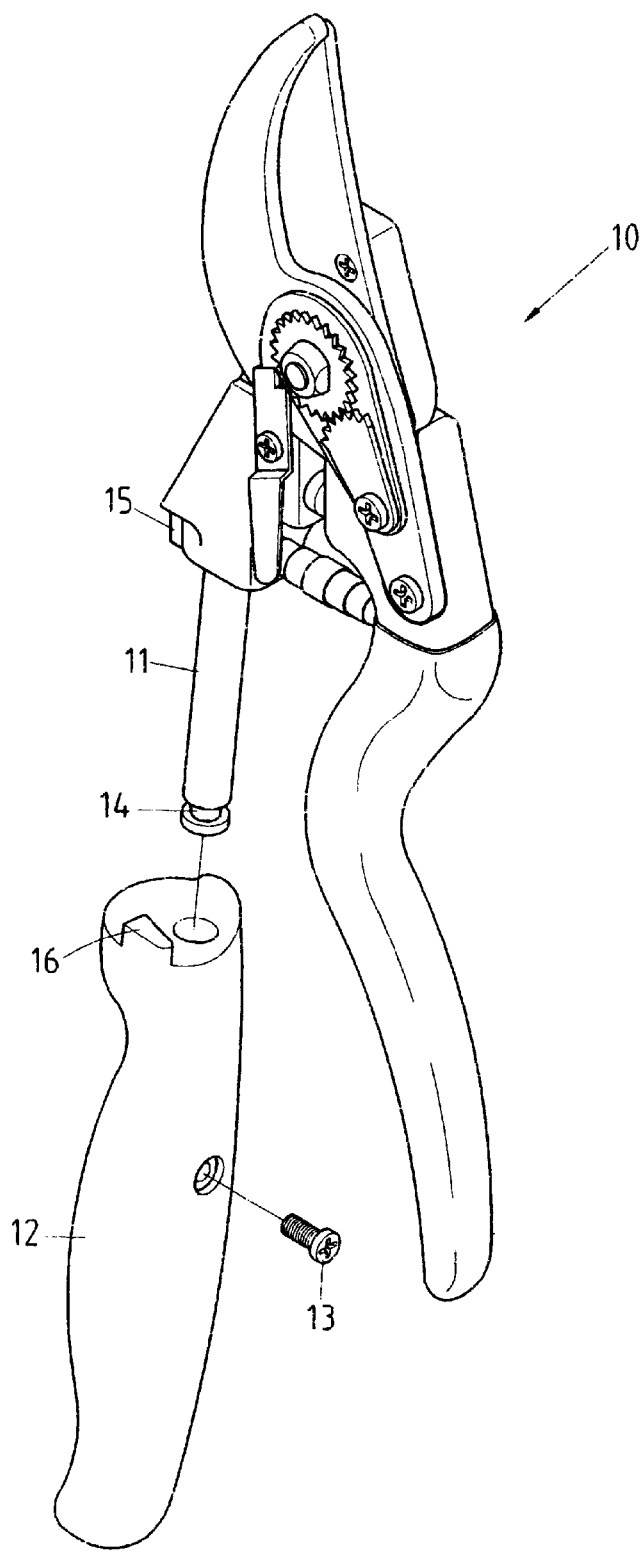
FIG. 1 shows an exploded view of a gardening shears of the prior art.
Figure 2:
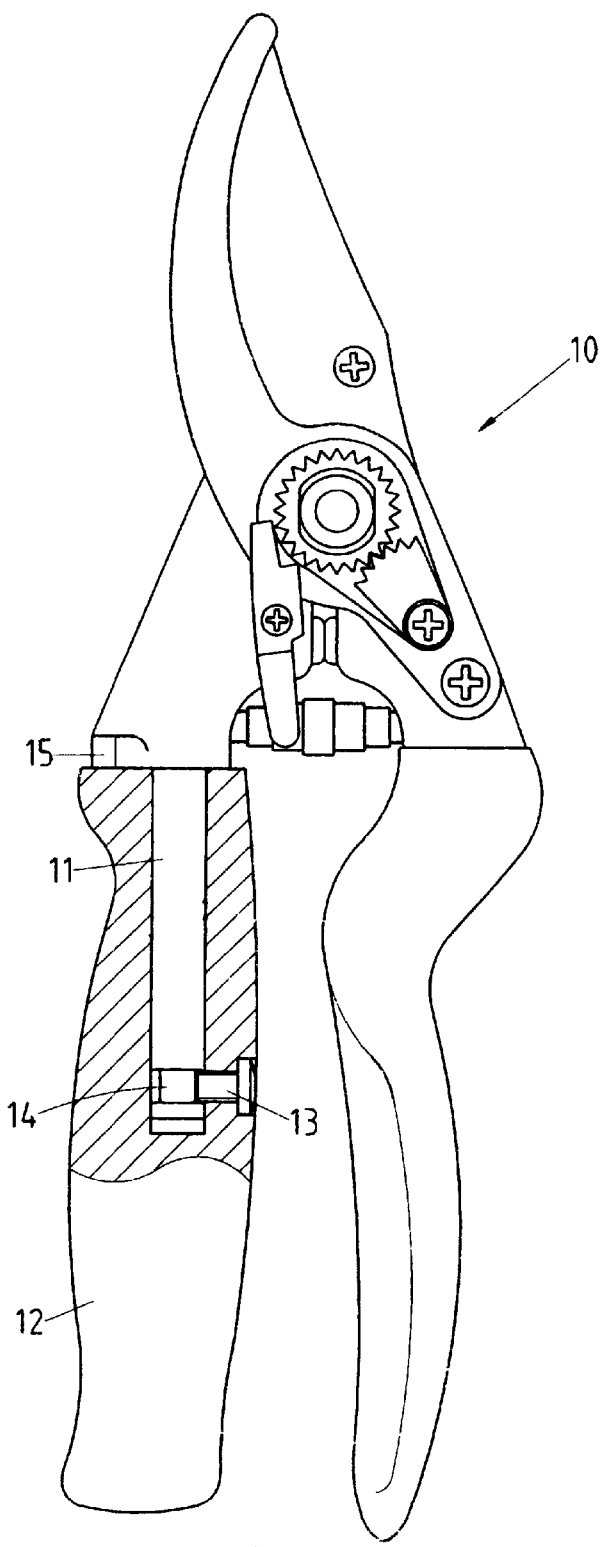
FIG. 2 shows a sectional view of the gardening shears of the prior art in combination.
Figure 3:
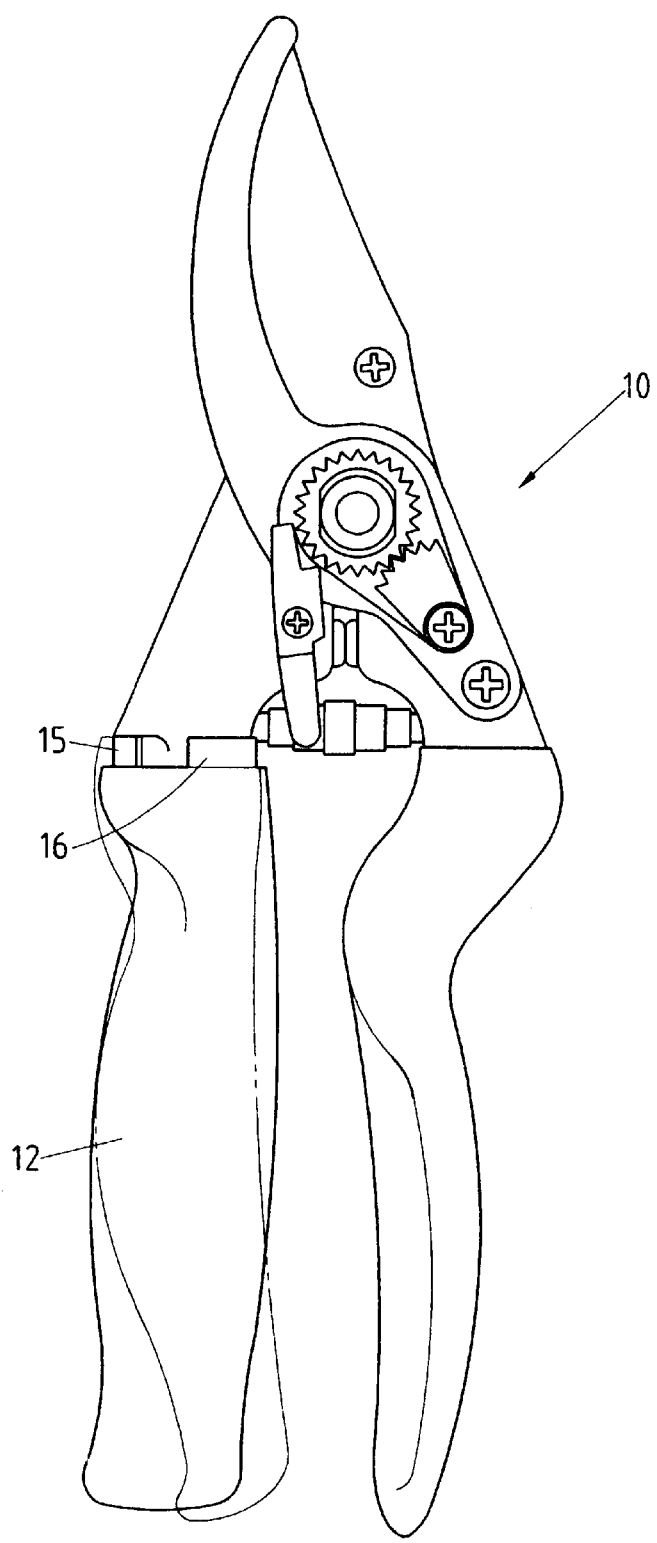
FIG. 3 shows a schematic view of the prior art gardening shears at work.
Figure 4:
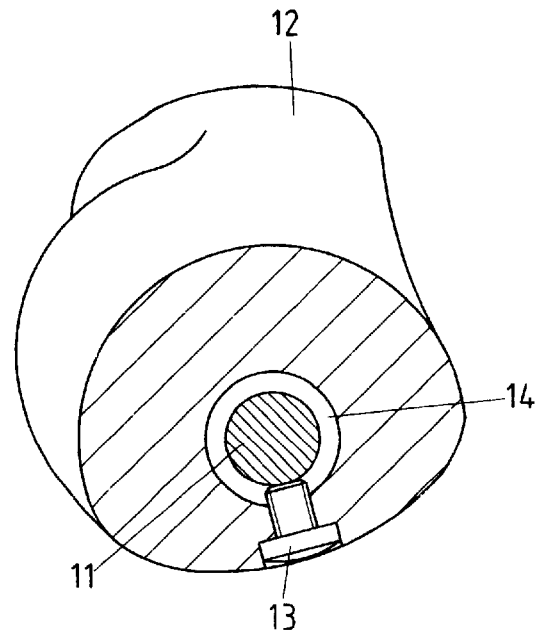
FIG. 4 shows a cross-sectional view of the handle of the prior art gardening shears.
Figure 5:
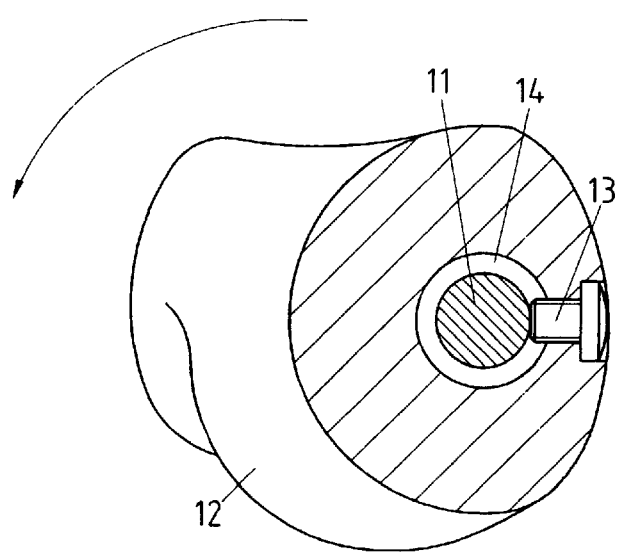
FIG. 5 shows a schematic view of the handle of the prior art gardening shears at work.
Figure 6:
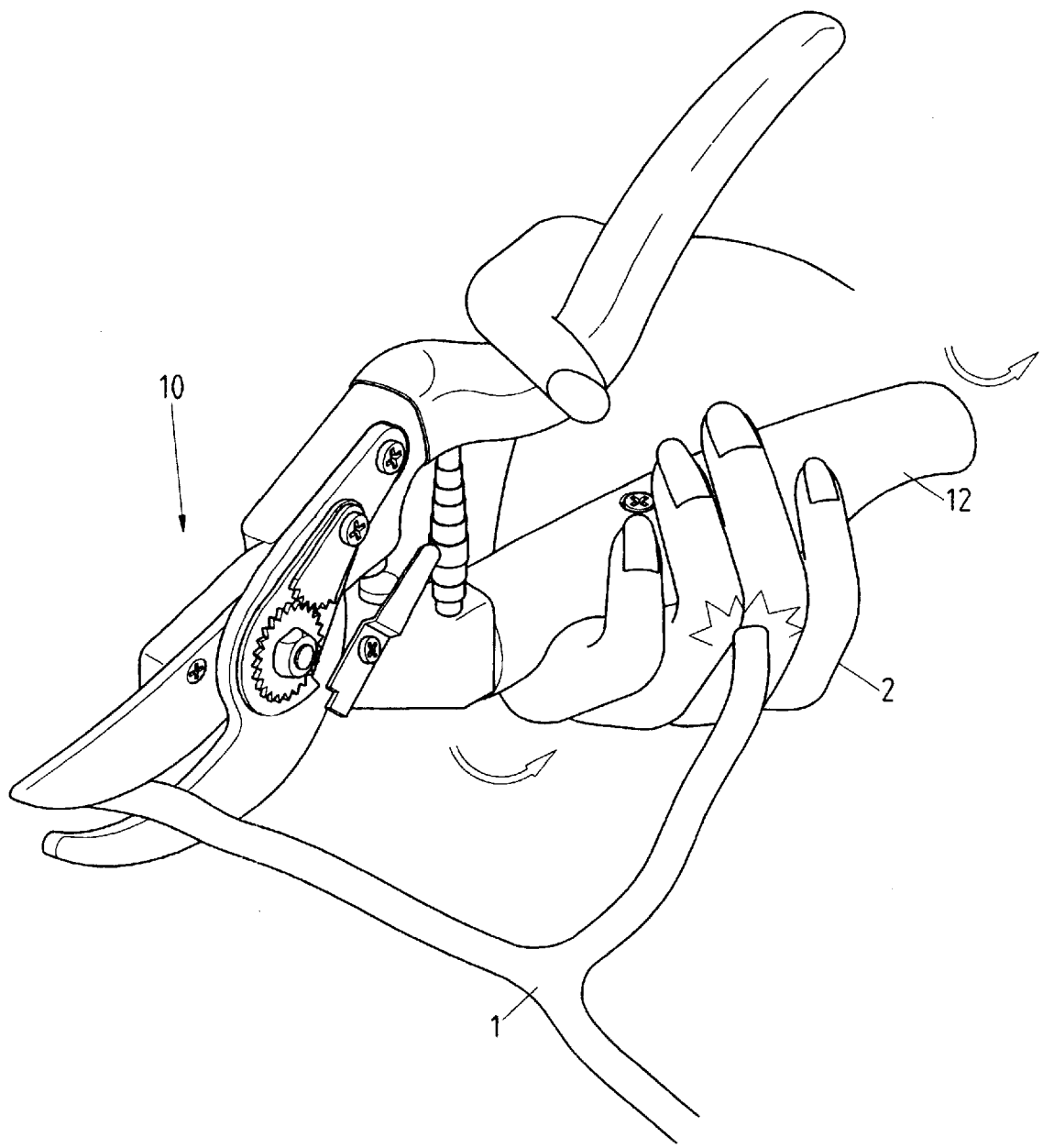
FIG. 6 shows a schematic view of the prior art gardening shears in operation.
Figure 7:
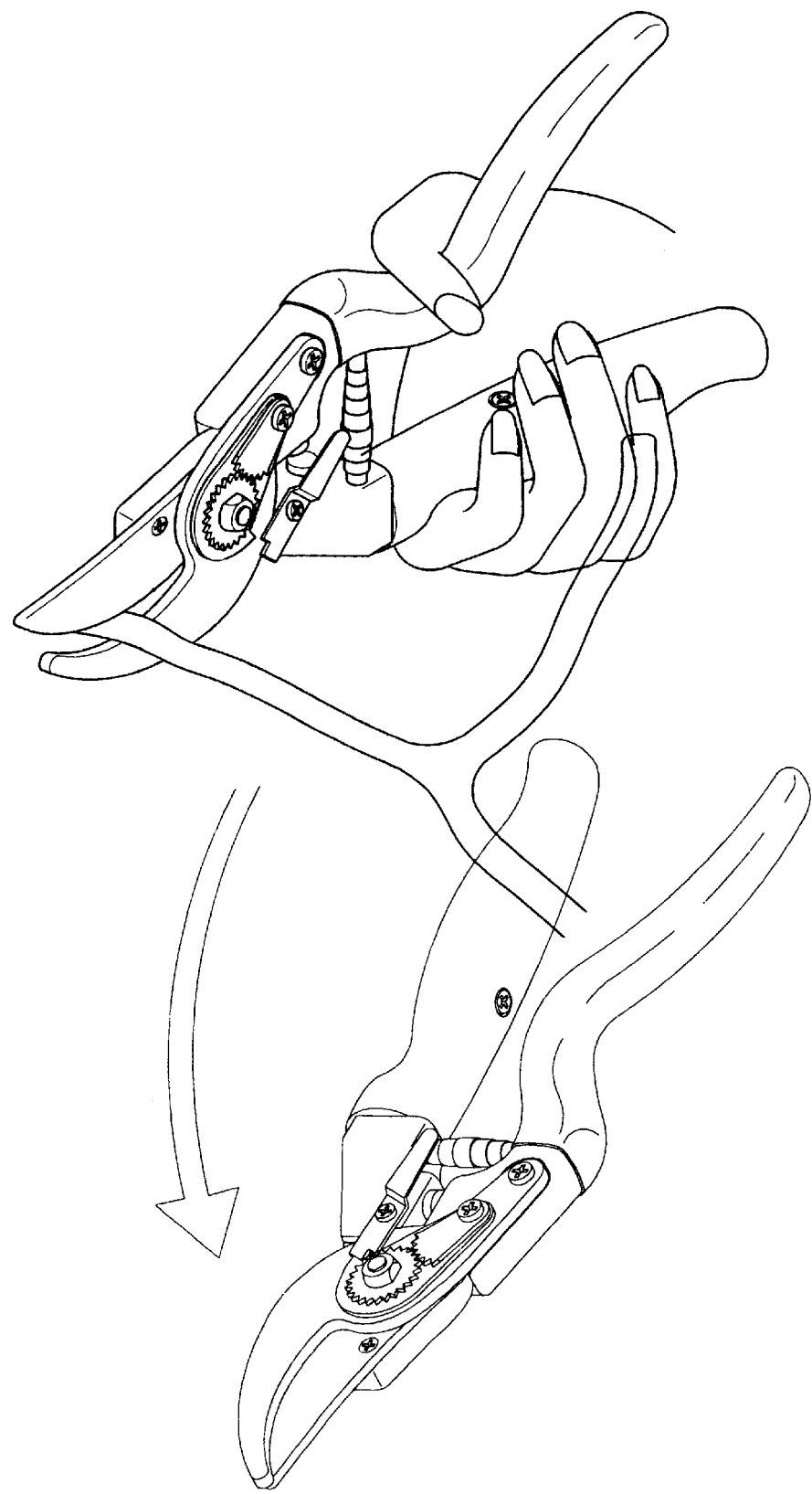
FIG. 7 shows another schematic view of the prior art gardening shears in operation.
Figure 8:
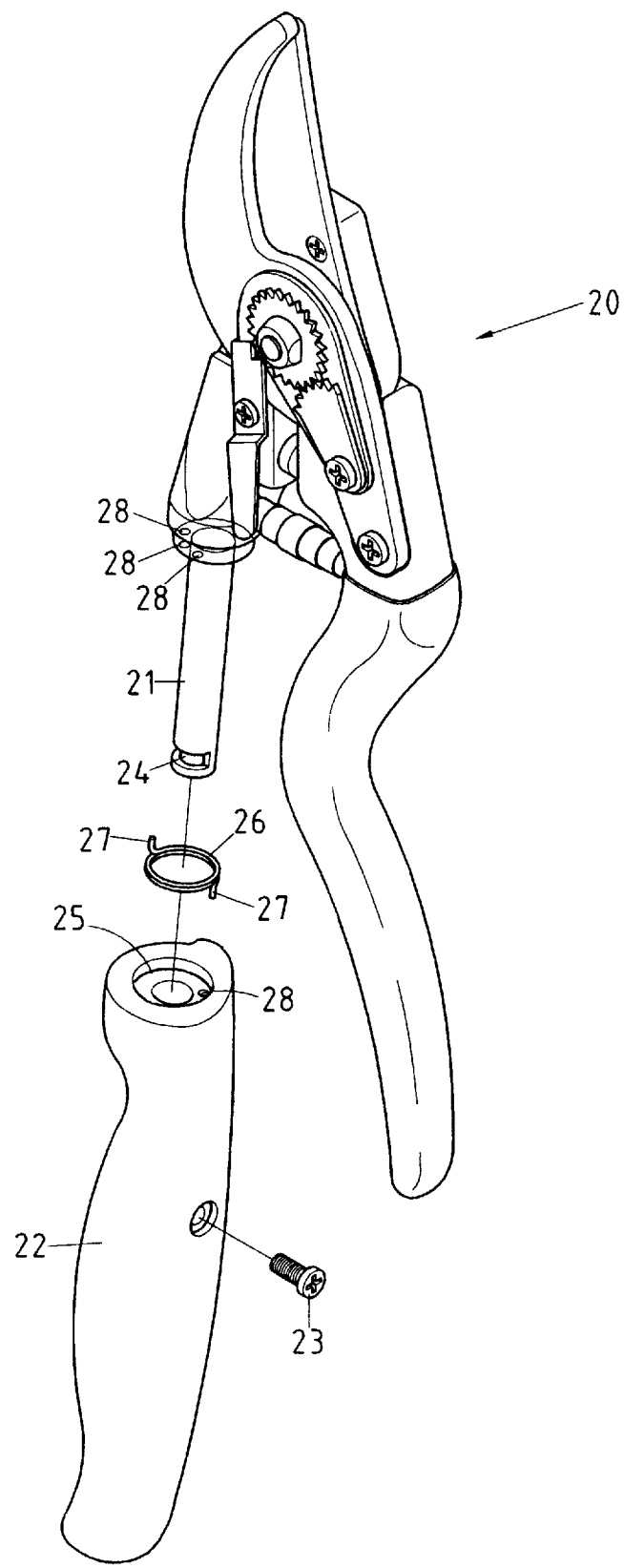
FIG. 8 shows an exploded view of a first preferred embodiment
Figure 9:
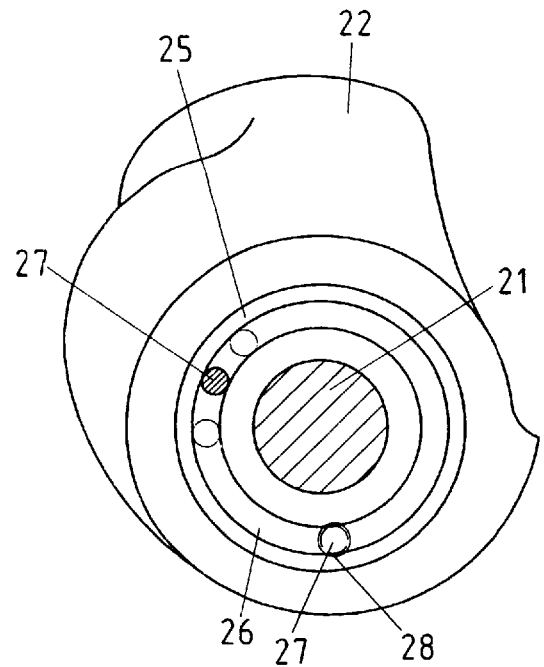
FIG. 9 shows a cross-sectional view of the handle of the first preferred embodiment of the present invention.
Figure 10:
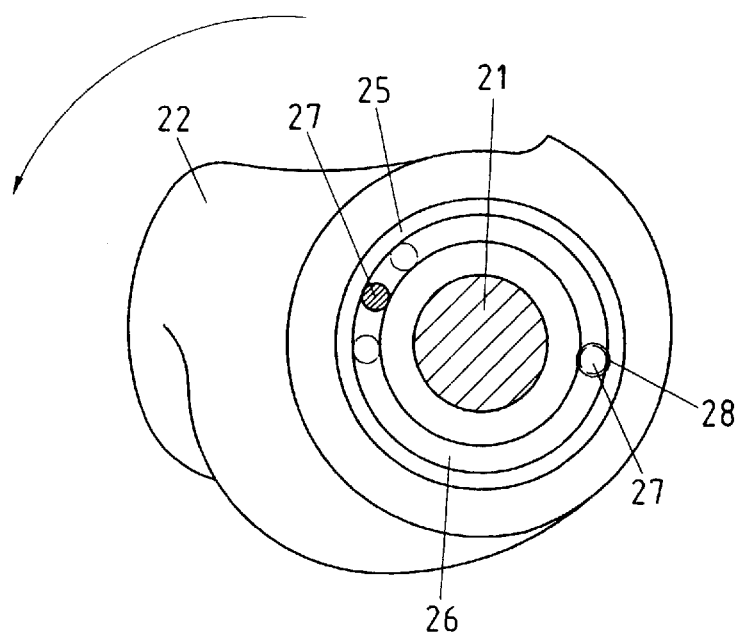
FIG. 10 shows a schematic view of the handle of the first preferred embodiment of the present invention in action.

As shown in FIGS. 8 , a gardening shears 20 embodied in the present invention comprises a shaft rod 21 for fastening pivotally a rotatable handle 22 which is provided with a confining bolt 23. The shaft rod 21 is provided at the free end thereof with a retaining groove 24 in which one end of the confining bolt 23 is retained, so as to prevent the handle 22 from becoming detached from the shaft rod 21, as illustrated in FIGS. 8, 9, and 10.

Figure 11:
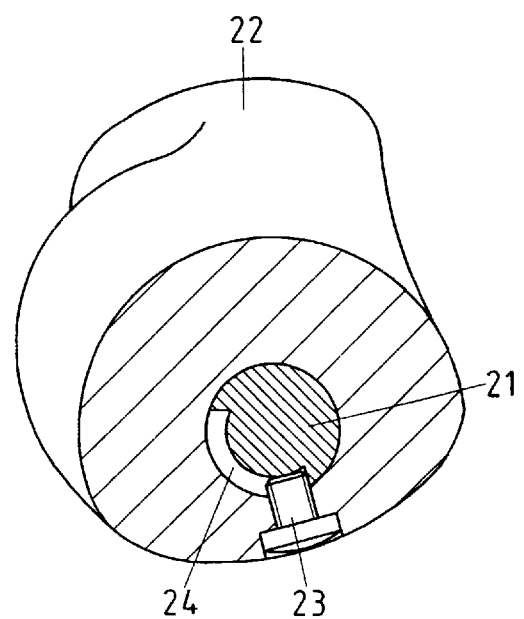
FIG. 11 shows another cross-sectional view of the handle of the first preferred embodiment of the present invention.
Figure 12:
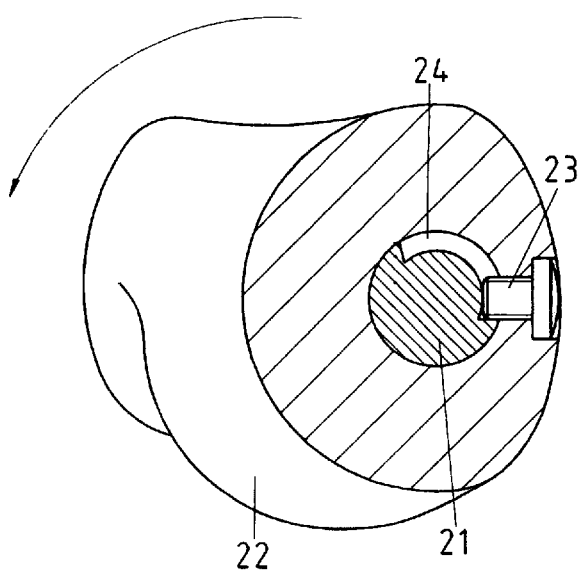
FIG. 12 shows another schematic view of the handle of the first preferred embodiment of the present invention in action.

The gardening shears 20 of the present invention is characterized by the handle 22 which is provided in the fastening end thereof with a receiving cell 25 and a rotary spring 26 disposed in the receiving cell 25. The rotary spring 26 has two retaining ends 27, which are inserted into the root portion of the shaft rod 21 and a retaining hole 28 in the receiving cell 25 of the fastening end of the handle 22. The retaining groove 24 of the shaft rod 21 has a predetermined length, as shown in FIGS. 11 and 12, thereby allowing the handle 22 to be swiveled in a predetermined range. In addition, the retaining hole 28 of the root portion of the shaft rod 21 or the handle 22 may be one or more in number so that the retaining ends 27 of the rotary spring 26 may be retained in different positions to provide the handle 22 with the swiveling forces different in magnitude.

Figure 13:
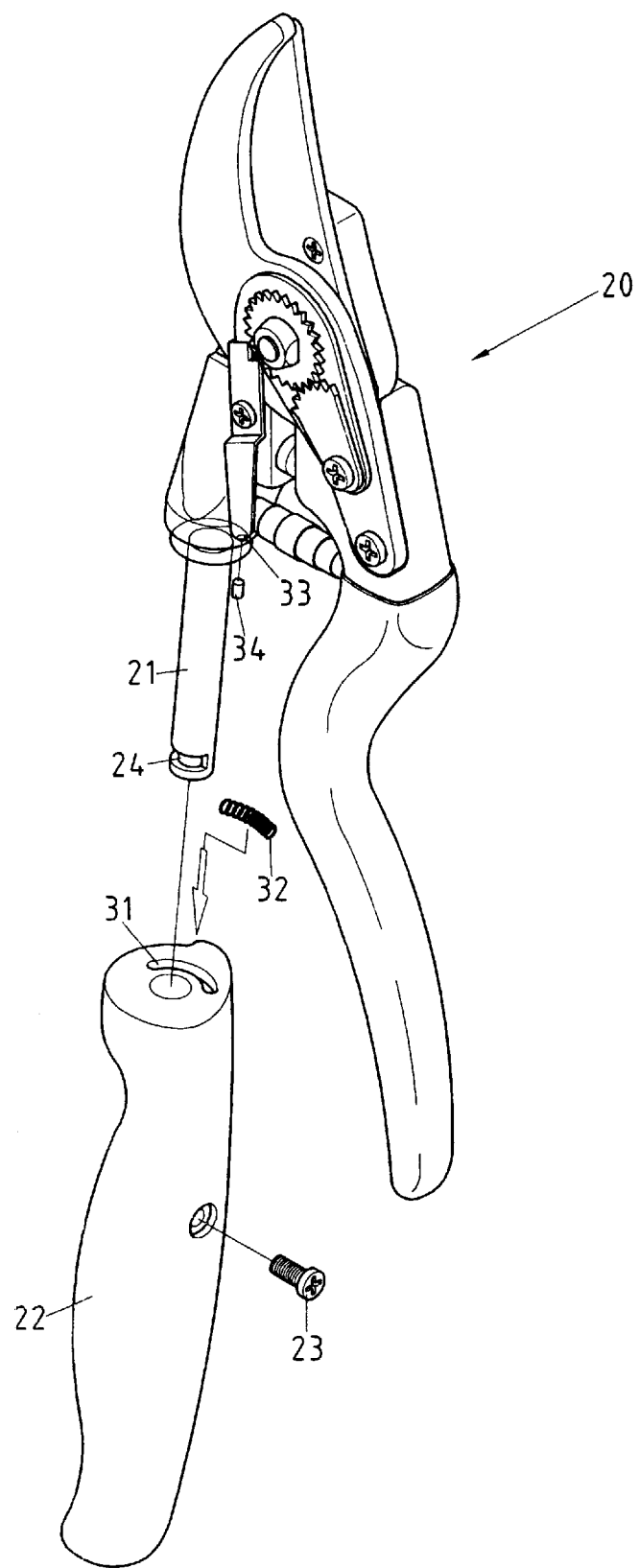
FIG. 13 shows another exploded view of the first preferred embodiment of the present invention.
Figure 14:
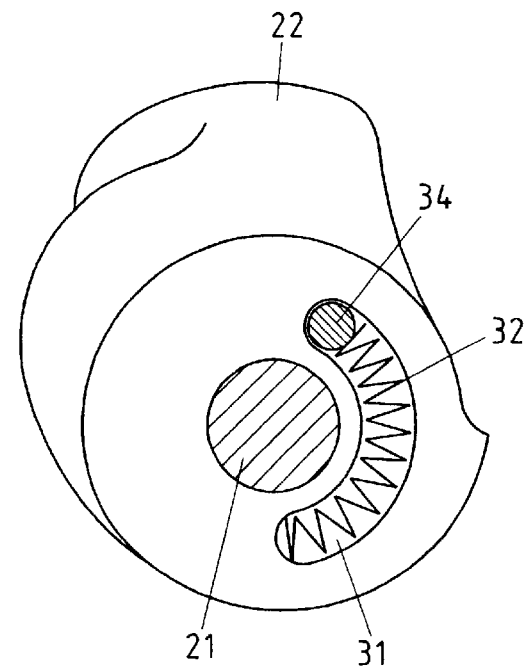
FIG. 14 shows another cross-sectional view of the handle of the first preferred embodiment of the present invention.
Figure 15:
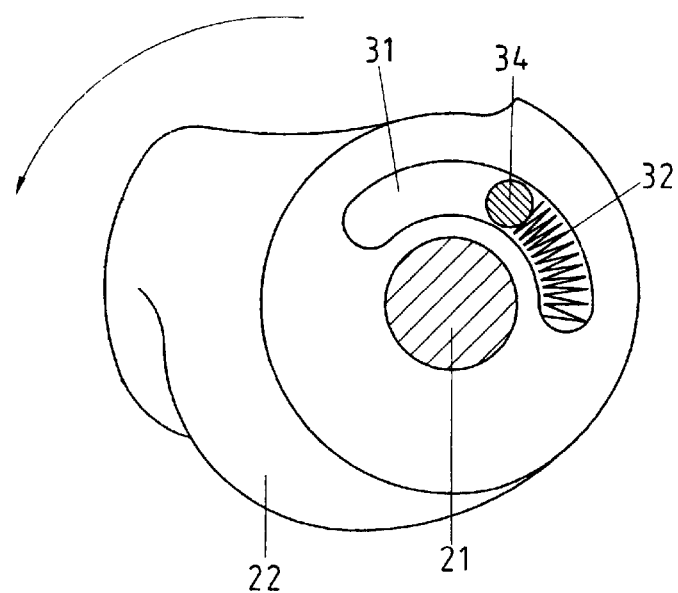
FIG. 15. shows another schematic view of the handle of the first preferred embodiment of the present invention in action.

As shown in FIGS. 13, 14, and 15, the handle 22 is provided in the fastening end thereof with an arcuate recess 31 in place of the receiving cell 25, and a tension element 32 in place of the rotary spring 26. The shaft rod 21 is provided in the root portion thereof with a support hole 33 and a bar 34 disposed in the support hole 33 such that one end of the bar 34 arrests one end of the tension element 32, thereby enabling the handle 22 to swivel automatically.

Figure 16:
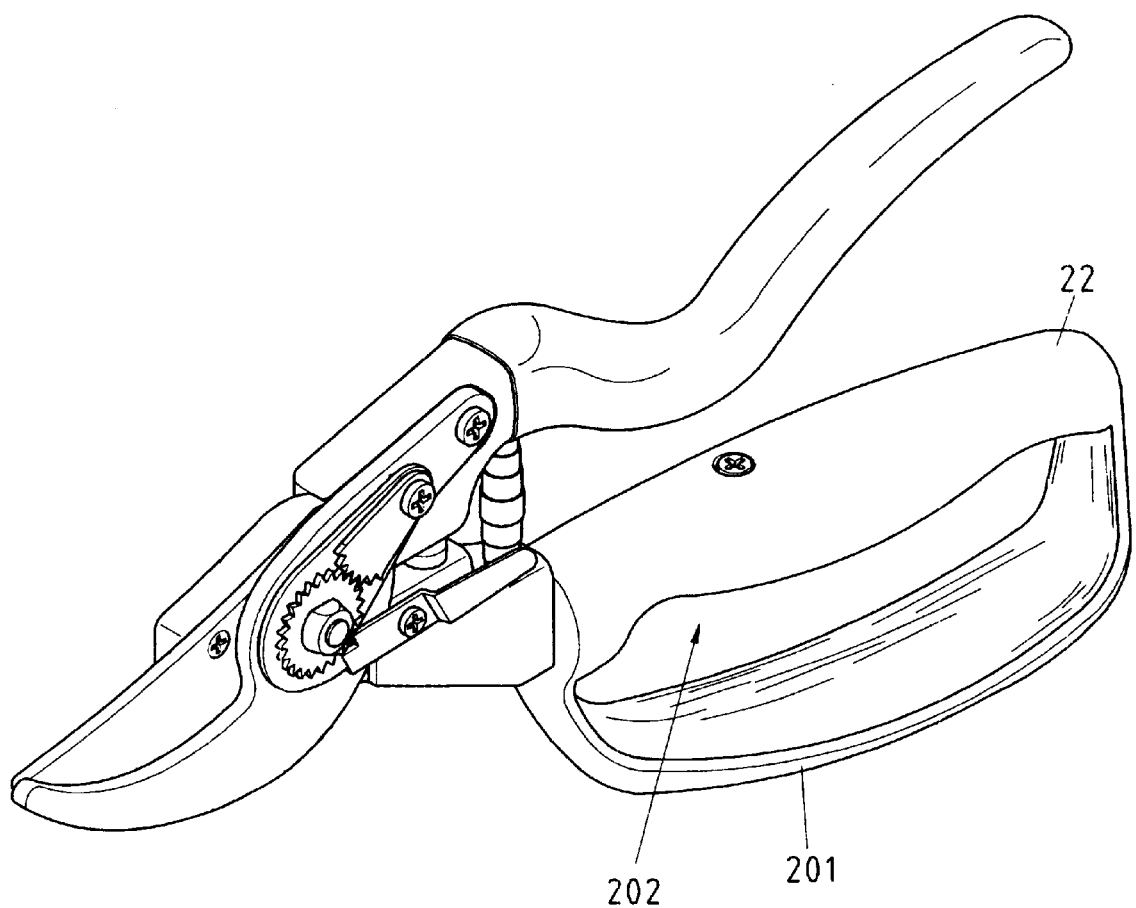
FIG. 16 shows a perspective view of a gardening shears of a second preferred embodiment of the present invention.
Figure 17:
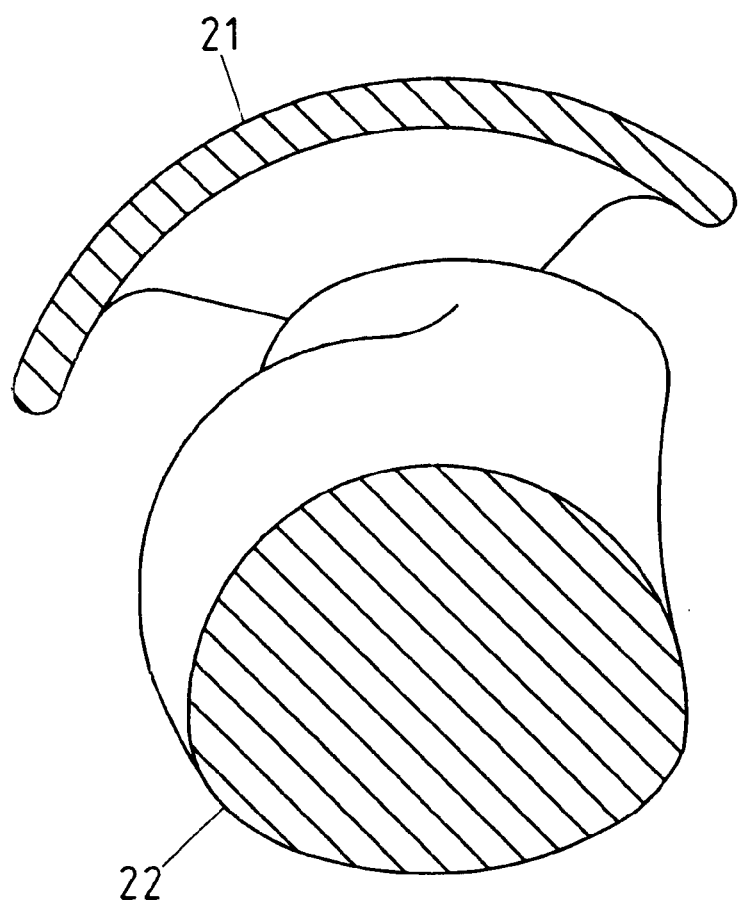
FIG. 17 shows a cross-sectional view of the handle of the gardening shears of the second preferred embodiment of the present invention.
Figure 18:
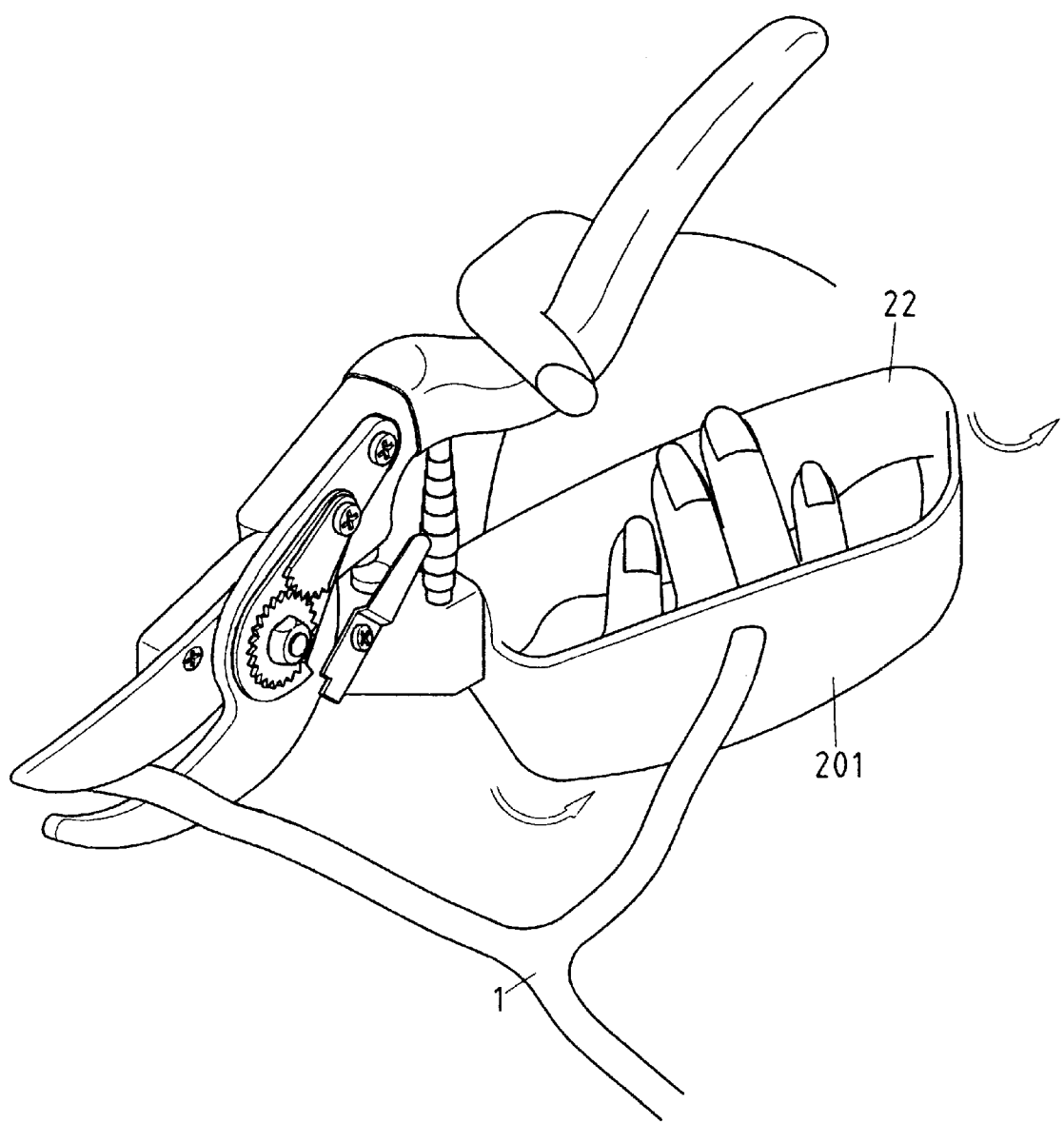
FIG. 18. shows a schematic perspective view of the second preferred embodiment of the present invention in operation.
Figure 19:
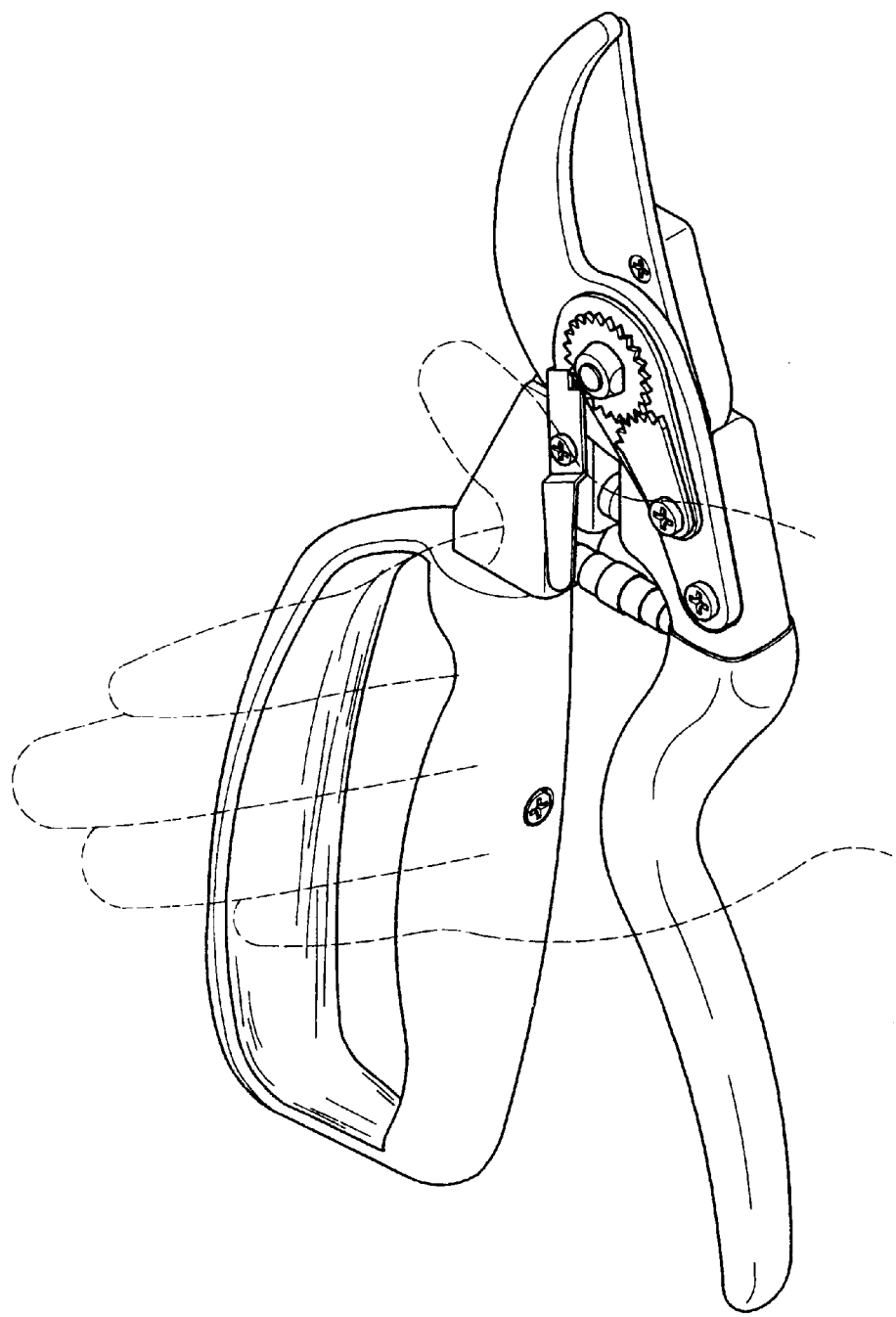
FIG. 19 shows a schematic view of the second preferred embodiment of the present invention provided with a means to prevent the gardening shears from slipping away from the hand.
Figure 20:
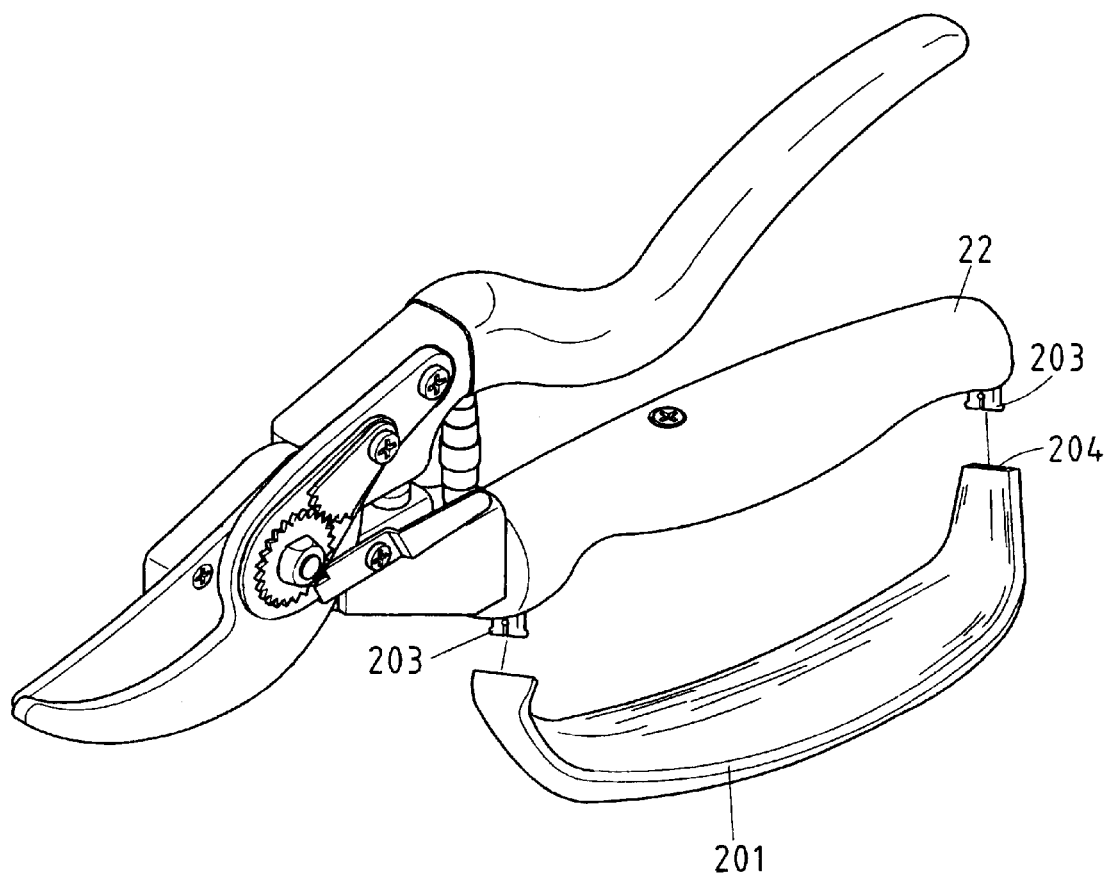
FIG. 20 shows an exploded view of a third preferred embodiment of the present invention.

As shown in FIGS. 16 and 17, the handle 22 of the second preferred embodiment of the present invention is provided with an arcuate portion 201 which is separated from the handle 22 by a space 202 dimensioned to allow fingers to put therethrough. In operation, the arcuate portion 201 serves to protect fingers from being bruised by a twig 1 of the garden plant, as illustrated in FIG. 18. In addition, the arcuate portion 201 serves to prevent the gardening shears 20 of the present invention from slipping away from the hand, as illustrated in FIG. 19. It must be noted here that the handle 22 and the arcuate portion 201 are made integrally. As shown in FIG. 20, the handle 22 of the third preferred embodiment of the present invention is provided with an arcuate portion 201 which is detachable attached to the handle 22. The handle 22 is provided at two opposite ends thereof with a tenon 203, whereas the arcuate portion 201 is provided at two opposite ends thereof with a mortise 204 corresponding in location to and engageable with the tenon 203. In the event that the arcuate portion 201 is damaged, it can be readily replaced with a new one.

The preferred embodiments of the present invention described above are to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A gardening shears comprising two handles, with one of said two handles being rotatable and pivoted at one end thereof with a shaft rod in conjunction with a confining bolt, said shaft rod provided at a free end thereof with a retaining groove in which one end of said confining bolt is retained, so as to prevent said one handle from being detached from said shaft rod; wherein said one handle is provided in a fastening end thereof with a receiving cell and a rotary spring disposed in said receiving cell, said rotary spring having two retaining ends which are inserted into a root portion of said shaft rod and a retaining hole in said receiving cell of said fastening end of said one handle, said retaining groove of said shaft rod having a predetermined length, thereby allowing said one handle to be swiveled in a predetermined rangle.

2. The gardening shears as defined in claim 1, wherein said root portion of said shaft rod or said one handle is provided with a plurality of said retaining holes endbling said retaining ends of said rotary spring to be retained in different positions to provide said one handle with the swiveling forces different in magnitude.

3. The gardening shears as defined in claim 1, wherein said one handle is provided with an arcuate portion which is made integrally with said one handle and is separated from said one handle by a space dimensioned to accommodate fingers whereby said arcuate portion serves to protect the fingers from being bruised by a twig being pruned.

4. The gardening shears as defined in claim 1, wherein said one handle is provided with an arcuate portion which is detachable fastened with said one handle such that said arcuate portion is separated from said one handle by a space dimensioned to accommodate fingers.

5. The gardening shears as defined in claim 4, wherein said one handle is provided at both ends thereof with a tenon; wherein said arcuate portion is provided at both ends thereof with a mortise; and wherein said arcuate portion is detachable fastened with said one handle such that said mortise is engaged with said tenon.

* * * * *